United States Patent Office 3,066,160
Patented Nov. 27, 1962

3,066,160
REFINING TALL OIL FATTY ACIDS
Burt L. Hampton, Port St. Joe, Fla., assignor to The Glidden Company, Cleveland, Ohio, a corporation of Ohio
No Drawing. Filed Apr. 11, 1960, Ser. No. 21,135
3 Claims. (Cl. 260—419)

This invention relates to a process for refining tall oil fatty acids and includes a process for treating crude as well as refined unsaturated fatty acids of commerce with reagents for the purpose of removing certain unsaponifiable materials as will be described more fully hereinafter. Reference will be made throughout this specification to the treatment of unsaturated tall oil fatty acids although any fatty acid containing unsaponifiable materials corresponding to those found in unsaturated tall oil fatty acids could likewise be treated in accordance with the process of this invention and such fatty acids are therefore included within the scope of this invention. This invention also relates to a novel, refined tall oil fatty acid composition derived from the treatment disclosed herein.

Briefly, tall oil from which the fatty acids of this invention are derived can be obtained from black liquor soap, a product of the Sulfate Paper Mills. The soap skimmings from the mills usually contain about 60% solids and upon acidulation yield about 50 to 56% of tall oil, comprising a typical formulation as follows:

| | |
|---|---|
| Acid number | 150–174 |
| Saponification number | 160–178 |
| Rosin acids, percent | 38– 53 |
| Fatty acids, percent | 38– 53 |
| Unsaponifiables, percent | 6.5– 10 |

In preparing tall oil fatty acids (the term "tall oil fatty acids" as used herein refers to unsaturated tall oil fatty acids) a tall oil as typified above is fractionated to separate the volatile fraction of crude oil from the non-volatile or pitch. This first step is accomplished in a continuous system in a flash tower. The volatile fraction is then fed to a fractionating column where rosin is separated from the bottom plates and the volatile fatty acids and unsaponifiables are taken from the upper plates. A third column can also be utilized to remove more rosin and unsaponifiables from the fatty acids. However, even in the most efficient fractionating systems the refined tall oil fatty acids still contain from 0.3% to 6% rosin acids and from about 0.3% to 4% unsaponifiables, the remainder being mostly linoleic and oleic fatty acids with a few percent of saturated fatty acids. The unsaponifiables have been isolated and found to be a complex mixture, a part of which is possibly formed by the decomposition of lignin. This fraction is probably composed of phenolic bodies since upon examination by infrared spectra there is a strong aromatic absorption at about 3.3 microns.

In addition to the above unsaponifiable material remaining in crude and refined tall oil fatty acids there are also certain rosin acids present which give a positive Liebermann-Storch test. Liebermann-Storch reacting materials are understood to be materials contained in tall oil fatty acids (probably unsaturated rosin acids of special configuration) which react with acetic anhydride and sulfuric acid when small amounts of these compounds are added to the tall oil fatty acids and impart a violet purple color to the mixture.

The unsaponifiable materials present in tall oil fatty acids usually contribute to poor color, heat stability, odor, and the like undesirable physical and chemical characteristics. A further undesirable characteristic of these unsaturated tall oil fatty acids, either refined or not, is that upon epoxidation of the double bonds present in the molecule, the products resulting from the epoxidation treatment have a Gardner-Holt color of from 11 to 14, that is a deep red or orange color. Since the demand for these tall oil fatty acids for use in the plasticizer fields depends to a great extent on the ultimate color of the epoxidized fatty acid product it is desirable, from a commercial standpoint, to produce a tall oil fatty acid of a Gardner color suitable for use in these plasticizer fields. Likewise, when these tall oil fatty acids are used in the manufacture of alkyds it is desirable that the resulting product be of a very light color in order to compete with other alkyds on the market. The tall oil fatty acids currently used and commercially available contain from 0.3% to 6% rosin acids and from about 0.3% to 4% unsaponifiables. When these acids are esterified and then epoxidized to yield products for use as plasticizers, the Gardner color is unsuitable for such purpose. Also their color upon being used in the manufacture of alkyds leaves much to be desired.

It is an object of my invention to treat tall oil fatty acids to remove unsaponifiable materials responsible for poor color. A further object of my invention is to prepare a product comprising tall oil fatty acids suitable for use in alkyd manufacture and for epoxidation and use thereafter in the plasticizer fields. A still further object of my invention is to refine tall oil fatty acids to obtain acids having a negative Liebermann-Storch reaction.

The treatment to be described hereinafter can be employed for tall oil fatty acids containing more than 6% unsaponifiable content or more than 6% of rosin acids, that is, crude tall oil fatty acids, but the invention preferably applies to refined tall oil fatty acids containing 6% or below of rosin acids and 6% or below of unsaponifiables. For the purpose of this invention these shall be referred to as merely as tall oil fatty acids.

I have found that I can obtain an improved tall oil fatty acid product which yields, upon epoxidation or upon use in alkyds, a product of improved color by a process which comprises heating a tall oil fatty acid in the presence of an acidic crystalline clay mineral and an organic aldehyde under conditions of agitation and thereafter recovering the thus treated fatty acids from the treated mixture. The treated fatty acids can be distilled thereafter for use in epoxidation reaction and in the plasticizer or alkyd field.

As used in this specification, the term "color" refers to the 1933 Gardner color standard.

THE CLAYS

It is well known that manufacturers of fatty acids have strived to improve the color, odor and heat-stability of fatty acid products. For example, fatty acids and vegetable oils can be bleached with natural absorbents such as "fuller's earth" and "activated" absorbents such as the sub-bentonite type clays.

Most raw clays show some ability to decolorize oils and most of these can be improved to some extent by acid treatment. However, only a few types can be activated by acid treatment to produce efficient adsorbents. The types usually used for activation are bentonites, consisting chiefly of montmorillonite clay minerals. Activated clays and the art of making them are old in the art. Activation is accomplished by treating a slurry of clay and water with a mineral acid such as hydrochloric or sulfuric in an amount of about 35% of the total dry weight of the clay. The mixture is then treated with steam to a temperature of about 200 to 210° F. for a period of about 5 to 6 hours and is thereafter washed and filtered. The teachings of U.S. Patents 1,397,113, 1,642,871, 1,776,990 and 1,796,799 are incorporated herein by reference. Patent Number 1,796,990 relates to the acid activation of sub-bentonite type clays and the example presented therein is illustrative of the method used for the preparation of the acid activated clays applicable to the process herein described. Reference is also made to Kirk and Othmer, "Encyclopedia of Chemical Technology," vol. 4, page 55 (1954) for a further description of acid activated clays. Examples of acid activated clays that can be prepared according to the prior art referred to are the various grades of commercially available trademarked products such as "Filtrol" and The Bennett-Clark clays. The "Filtrol" trademark identifies a group of acid-activated adsorbents and catalysts from the mineral montmorillonite, (MgCa) $OAl_2 5SiO_2 nH_2O$. The acid-activated materials are supplied as fine white powders, 85–95% passing through a 200-mesh screen. In the process of this invention the "activated" type clays are preferred, and especially the acidic crystalline clay mineral of a pH of from about 2 to 5.0. Lower pH clays can be used satisfactorily. The examples presented herein below illustrate the use of these acid activated adsorbents and will be referred to as acid-activated crystalline clay(s) or simply as clay(s).

TALL OIL FATTY ACIDS

The tall oil fatty acids applicable in the process of this invention are largely unsaturated fatty acids containing major amounts of linoleic and oleic acids and a few percent of other materials, e.g., saturated fatty acids such as palmitic acid. Typical compositions of tall oil fatty acids available commercially analyze as follows:

*Table*

| Commercial Tall Oil Fatty Acid | Color | Acid No. | Rosin Acids, percent | Unsap. |
|---|---|---|---|---|
| A | 4 | 198.4 | 0.9 | 0.5 |
| B | 5 | 197.7 | 1.1 | 0.8 |
| C | 3–4 | 197.5 | 1.0 | 1.6 |
| D | 3–4 | 198 | 0.5 | 0.6 |
| E | 8–9 | 193 | 3.8 | 3.0 |
| F | 6 | 196 | 1.0 | 1.5 |

A more detailed analysis of two of the above representative tall oil fatty acids follows:

Tall oil fatty acids D and F:
  Gardner color _____ 3 to 6.
  Acid number _____ 194 to 198.
  Saponification number _____ About 196.
  Iodine number _____ About 130.
  Rosin acids _____ 0.6 to 1.5%.
  Unsaponifiables _____ 0.6 to 2.4%.
  Fatty acids, present percentages:
    Linoleic acid _____ About 48%.
    Oleic acid _____ About 50%.
    Saturated acids _____ About 2%.

Examples will be presented hereinafter showing the results obtained by the process of this invention in the improvement of color, after epoxidation, of some of the tall oil fatty acids above. The tall oil fatty acids as described herein are treated with an acidic clay and minor amounts of an organic aldehyde such as formaldehyde. The term "formaldehydye" when used in this specification includes paraformaldehyde and aqueous formaldehyde, that is, the formalin of commerce, acetaldehyde, benzaldehyde and the like organic aldehydes. Emphasis will be placed on the use of paraformaldehyde throughout the examples offered in the specification of this invention.

The process of this invention consists essentially of contacting a tall oil fatty acid with from say 0.2 to 5% by weight of an aldehyde based upon the weight of the tall oil fatty acid in the further presence of say 0.3% to 10% of clay, and heating said mixture for a period of time from 1 to 6 hours at a temperature of from about 50° to 150° C. or higher. A more practical range of materials and reaction conditions can be used, for example for refined commercial tall oil fatty acids A through F and the like, that is, 1 to 3% of an acid clay such as the trademark product "Filtrol" and from 0.3 to 1% of an organic aldehyde at a temperature of from 80° to 150° C. For crude tall oil fatty acids, that is, those containing above 6% rosin acids and above 6% unsaponifiables, the broader range of reaction conditions can be advantageously employed. Also in the instance of the clay treatment, the fatty acids can be passed through a column of such containing the aldehyde in which case obviously more than 10% of clay by weight is used.

The tall oil fatty acids, treated as disclosed above, are next recovered from the mixture for example by filtration or by any other suitable method. The filtrate is thereafter distilled in order to obtain the novel composition of this invention.

Distillation of the treated and recovered fatty acids is not necessary, but is desired in the process of this invention when the fatty acids are to be epoxidized for use as plasticizers. I have found, for example, that if the tall oil fatty acids are not distilled after having been treated as herein described and upon further epoxidation, that the resulting epoxidized tall oil fatty acids are not as good in color in comparison to like-treated tall oil fatty acids which have been distilled after the treatment provided herein. Distillation of the treated tall oil fatty acids batchwise or continuously is conveniently carried out under a good vacuum, for example at 1 to 2 mm. Hg absolute with no fractionation. Distillation conditions can vary, however, and it is within the skill of the art to determine the best distillation conditions when working with tall oil fatty acids. Thus, tall oil fatty acids can be distilled at pressures, say of up to about 30 mm. Hg absolute, without appreciable side reactions. At 30 mm. Hg absolute tall oil fatty acids boil at about 252° C. Also, where practical, distillation with steam is advisable, but not necessary. Distillation without steam and at about 5 mm. Hg absolute yields very good results. By the process of this invention I have succeeded in obtaining a recovery of about 97% tall oil fatty acids free of objectionable unsaponifiables.

The use of clay and an aldehyde for the refining of tall oil fatty acids represents the best method of practicing this invention. The use of a small amount of sulfuric acid, i.e., about 0.1% instead of clay, does produce a satisfactory product, however, but this variation in treatment is less preferred.

In the examples presented herein below demonstrating the process of this invention the tall oil fatty acid identified as "B" above was used. A typical analysis of this grade of fatty acids is as follows: Acid number 196.5–197.8; rosin acids percent, 0.8–1.4; unsaponifiables percent, 0.8–1.4; iodine value 130–134; color 5–6 (Gardner 1933 Standards).

The procedure used for carrying out these experiments was to heat about 500 grams of the fatty acids to the desired temperature in a 1-liter, 3-neck round bottom flask fitted with a stirrer, a thermometer and a nitrogen inlet tube. In all examples the fatty acids were covered with nitrogen. The desired amount of clay and paraform was added and the reaction mass stirred vigorously for the desired time. The clay was then removed by filtering using a Buchner funnel at a temperature not greater than around 90° C. The filtrate was then distilled at 1–2 mm. Hg absolute with no fractionation. The distillation step greatly improves the product and the color of the epoxidized solution is greatly improved over that of a tall oil fatty acid which has been similarly treated but not distilled. For example, in a typical experiment the color of the original tall oil fatty acid B was 5–6 Gardner. The color of the product after treating and filtering out the clay but not distilling was 5–6. The color of the epoxidized solution was 6 to 7 with no red versus a 14 and deep red for an untreated but epoxidized tall oil fatty acid. On distilling the filtrate of the treated tall oil fatty acid the color of the distillate was 2 to 3 and the epoxidized solution was also 2 to 3. Thus in these examples it was found that (a) an untreated tall oil fatty acid, that is, a commercial fatty acid of color 5 to 6 Gardner if epoxidized, yields a product of 14 Gardner color and deep red; (b) a similar fatty acid treated with clay and an aldehyde but not distilled, yields on epoxidation a 6 to 7 Gardner color product and no red color; (c) a similar fatty acid treated with clay and an aldehyde, recovered and distilled, yields on epoxidation a 2 to 3 Gardner color and almost water white. Thus, by the process of this invention, I can treat ordinary commercial fatty acids with clay and an aldehyde and obtain a product suitable for use in many fields. If a high quality product is desired then I can further distill the treated fatty acids under a good vacuum as mentioned hereinabove.

A simple method for epoxidizing the treated tall oil fatty acids is as follows: to 266 grams of glacial acetic acid there is added 38 grams of 90% hydrogen peroxide and 3 grams of reagent grade sulfuric acid. This mixture is then allowed to stand at 24 to 28° C. until ready for use (See: Analytical Chemistry 20 1061 (1948)). In testing tall oil fatty acids with this epoxidizing solution, 5 ml. of the treated acids are treated with 5 ml. of the peracetic acid solution prepared above and the solution is then shaken well and cooled on an icewater bath. The solution is then removed from the bath and graded on a Gardner colorimeter or the like.

Table I records the results of experiments using tall oil fatty acid B which was treated according to the method described above and distilled under vacuum.

*Table I*

| Ex. | "Filtrol," percent | $CH_2O$, percent | Temp., °C. | Time, Hours | Distillate | |
|---|---|---|---|---|---|---|
| | | | | | Gardner Color | Color of Soln. after Peroxidation |
| 1 | 1.0 | 0.3 | 90 | 1.5 | 3 | 6 |
| 2 | 1.0 | 0.5 | 90 | 1.0 | 3–4 | 7 |
| 3 | 1.0 | 0.5 | 90 | 4.0 | 3–4 | 4 |
| 4 | 1.0 | 0.5 | 120 | 4.0 | 3–4 | 2–3 |
| 5 | 2.0 | 0.5 | 90 | 1.5 | 2–3 | 2–3 |
| 6 | 2.0 | 1.0 | 90 | 1.5 | 2–3 | 2–3 |
| 7 | 2.0 | 0.5 | 60 | 16.0 | 2–3 | 4 |
| 8 | 2.0 | 0.5 | 70 | 4.0 | 2–3 | 4 |
| 9 | 2.0 | 0.5 | 80 | 4.0 | 2–3 | 2–3 |
| 10 | 2.0 | 1.0 | 90 | 4.0 | 2–3 | 2 |

An examination of Table I reveals that by using 1% of an acid activated clay and 0.5% paraform at 120° C. (Exp. 4) a very good product can be produced. However, at 90°, 2% clay is desirable (Exp. 5). It is also desirable, both from a plant production standpoint and yields, that as low a temperature as practical be used. The table also adequately demonstrates the effect of time on heating.

By the process of this invention about half of the unsaponifiables ordinarily present in tall oil fatty acids can be removed and very economically.

As an example of the improvement of the overall grade of tall oil fatty acids accomplished by this invention reference is made to Experiment 4 of Table I. The tall oil fatty acid raw material had an acid number of 197.0, unsaponifiables 0.94%, rosin acids 1.12% color 5–6. After treatment the acid number was 199, unsaponifiables 0.5%, rosin acids 1.03%, and color 2 to 3.

By the treatment of tall oil fatty acids as above, the treated product appears to have very little conjugated rosin acids present as the Liebermann-Storch color test is negative after such treatment.

As an example of how unsaponifiables can be reduced from a crude tall fatty acid the following experiments in Table II were performed on crude tall oil fatty acids from a plant column. The acids were treated according to the method described herein and distilled under a good vacuum. Analysis of the crude tall oil fatty acids: Acid Number 185.2, rosin acids 1.5%, unsaponifiables 6.1%, color (Gardner) 9 to 10.

*Table II*

| Ex. No. | "Filtrol," Percent | $CH_2O$, Percent | Temp., °C. | Time, Hours | A.N. | Rosin Acids, Percent | Unsaps., Percent | Color | Residue, Percent |
|---|---|---|---|---|---|---|---|---|---|
| 11 | 2.0 | 2.0 | 90 | 2 | 188 | 1.4 | 5.3 | 8 | 3.5 |
| 12 | 2.0 | 3.0 | 90 | 2 | 189 | 1.4 | 5.2 | 6–7 | 3.5 |
| 13 | 2.0 | 4.0 | 90 | 2 | 188 | 1.4 | 5.1 | 7–8 | 3.5 |
| 14 | 2.0 | 3.0 | 120 | 2 | 190 | 1.4 | 3.8 | 8–9 | 4.8 |
| 15 | 4.0 | 4.0 | 130 | 4 | 191 | 1.4 | 3.2 | 8–9 | 9.5 |

The product of Ex. 15 showed no darkening on subjecting to the peroxidation test, the final color of the solution being 7–8.

EXAMPLE 16

Tall oil fatty acid B (500 g. Gardner color 5–6) was heated at 90° C. for 4 hours with 0.1% sulfuric acid and 1.0% paraform. After washing out the sulfuric acid the material was distilled at 2 mm. Hg absolute. The distillate had a Gardner color of 3–4 and the peroxidation solution a color of 2–3 with no red tinge. The infrared spectrum showed that no trans acid was produced by this treatment.

In working with large scale runs of tall oil fatty acids and the process of this invention I have successfully treated a fatty acid of Gardner color 6 to 7 by heating the acid for 4 hours at 80 to 100° C. with 0.5% paraform and 1.0% "Filtrol" Grade 4. The treated and distilled material resulted in a fatty acid of 2 to 3 Gardner color versus a 14 and red for the untreated. When the amount of clay was reduced to 0.5% ("Filtrol" Grade 4) the distilled and epoxidized solution had a color of 5 to 6 (3 to 4 after distillation). These examples show the efficacy of the treatment of this invention.

EXAMPLE 17

Three hundred sixty grams (360) of tall oil fatty acids analyzing as follows: A.N. 197, Rosin acids 1.1%, color 3 to 4, unsaponifiables 0.9%, was treated with 0.5% paraform and heated in a 760 cc. Aminco bomb, while rocking, at 225° C. for 2 hours. The product was vacuum distilled at 2 mm. Hg absolute with no fractionation. This experiment was duplicated with 0.5% acetaldehyde.

The following table records the results of these experiments.

*Table III*

| | A.N. | Color | Rosin Acids, Percent | Unsaps., Percent | Epoxidation Soln. Color |
|---|---|---|---|---|---|
| Paraform Treated | 195.5 | 3–4 | 1.0 | 0.31 | 8–9 (Orange). |
| Acetaldehyde Treated | 198 | 2–3 | 0.9 | 0.51 | 9 (Orange). |

From these experiments it is seen that treating tall oil fatty acids with paraform and acetaldehyde in a bomb as described does improve the product. However, the epoxidation solution is darker colored and contains more red than when clay and paraform are used.

Tall oil fatty acids which have been treated according to the process of my invention have been found to produce lighter colored alkyds than from any other tall oil fatty acids commercially available. For example, several alkyds of the short oil type were prepared from tall oil fatty acids treated as herein described and from commercially available tall oil fatty acids and then compared. It was found that the alkyds prepared from the fatty acids of this invention were of lighter color than those which had not been treated. Thus by the process of this invention I have succeeded in providing novel products which find many uses in industry.

Both methods of treating the fatty acids, that is, (a) treating with an acidic clay and an aldehyde and recovering the acids but not distilling, and (b) the distilled acids of (a), yield novel compositions of matter as shown above and in view of the products resulting from such reactions as epoxidation, use in alkyd formation, etc.

Resort can be had to modifications of this invention falling within the spirit and scope of the appended claims.

Having thus described my invention, I claim:

1. The process which comprises heating a tall oil fatty acid composition consisting essentially of tall oil fatty acids but containing unsaponifiable phenolic impurities with from 0.2% to 5% by weight of an aldehyde in the presence of an acid catalyst at a temperature of from about 50° C. to 150° C. under conditions of agitation and distilling the thus treated fatty acids.

2. The process of claim 1 in which the catalyst is an acid having a pH value less than about 5.

3. The process of claim 2 in which the aldehyde is formaldehyde.

References Cited in the file of this patent

UNITED STATES PATENTS

| | | |
|---|---|---|
| 2,720,513 | Rummelsburg | Oct. 11, 1955 |
| 2,720,514 | Rummelsburg | Oct. 11, 1955 |